Aug. 1, 1967 — H. M. BUCK — 3,334,226
APPARATUS FOR SIMULTANEOUSLY MEASURING FLUID DENSITY AND FLOW RATE ON A SINGLE PHOTOGRAPHIC FILM
Filed Dec. 30, 1963 — 2 Sheets-Sheet 1
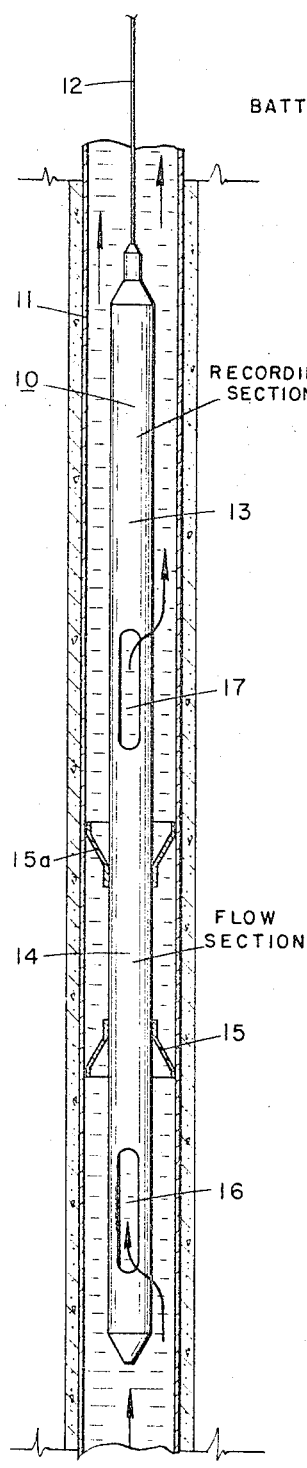
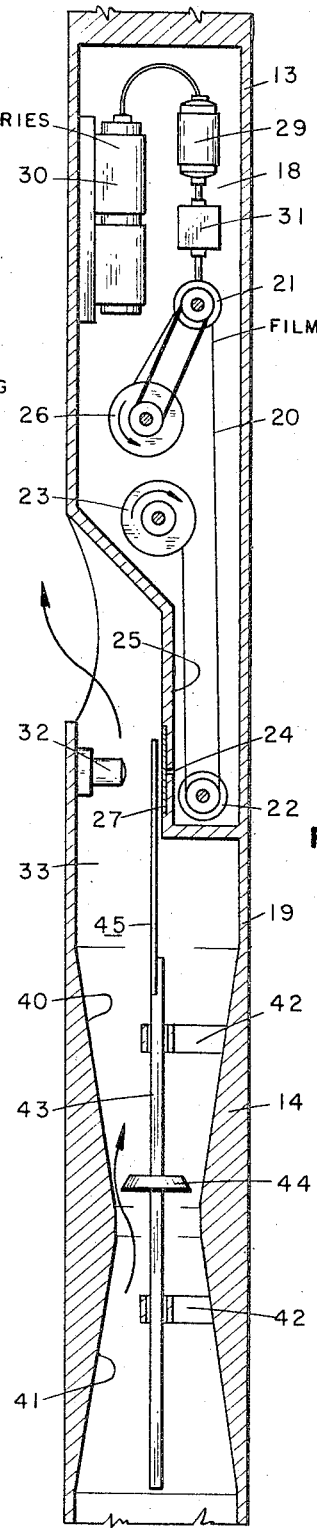
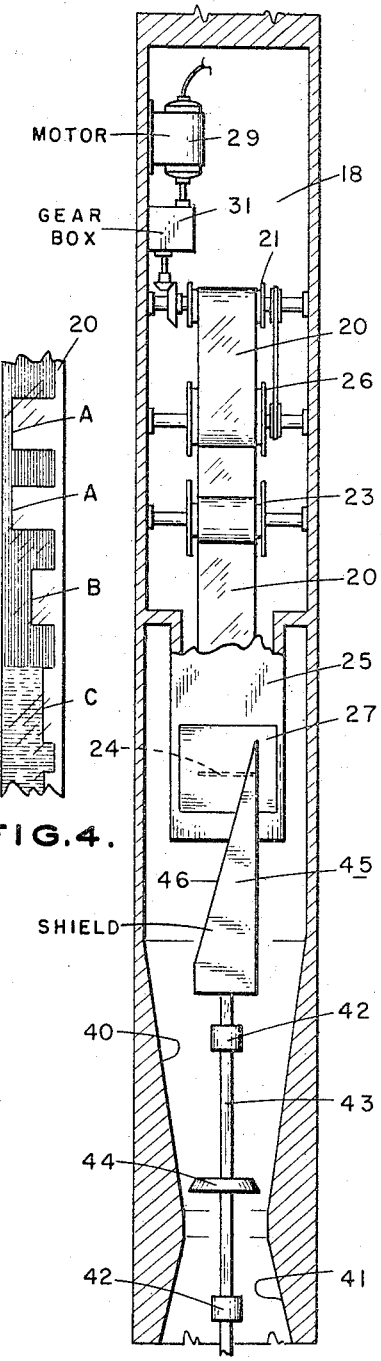
INVENTOR.
HENRY M. BUCK
BY John D. Schneider
ATTORNEY.

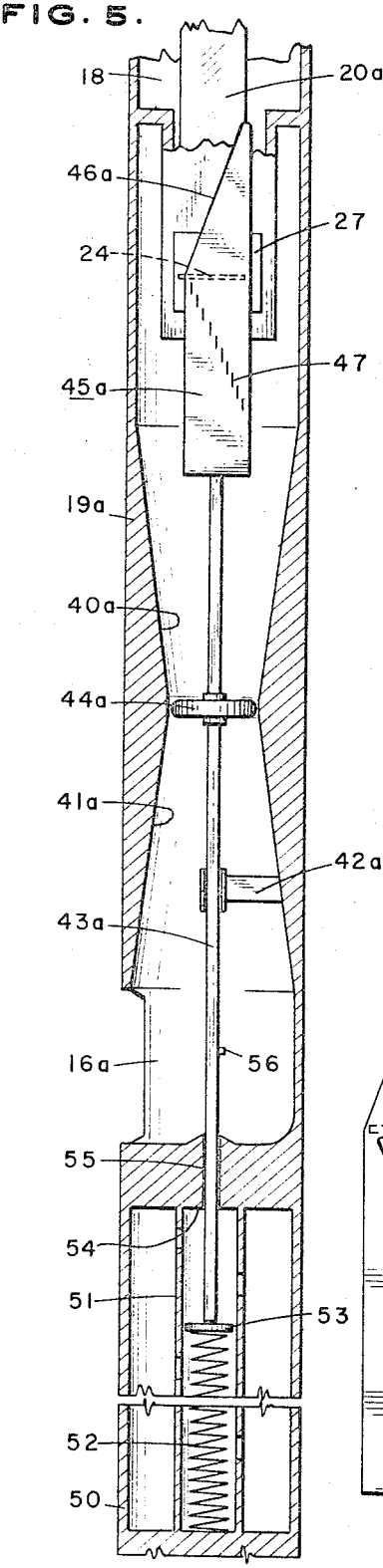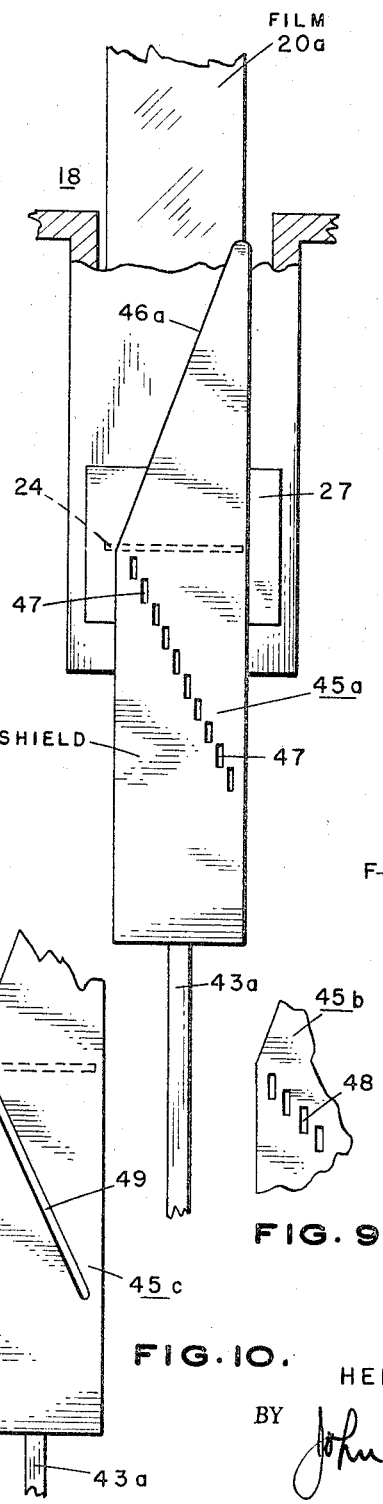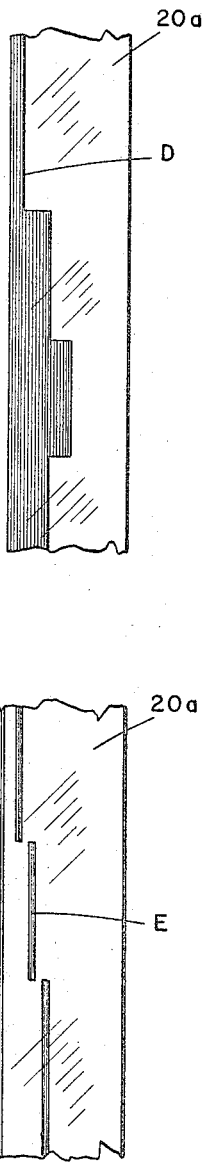

United States Patent Office 3,334,226
Patented Aug. 1, 1967

3,334,226
APPARATUS FOR SIMULTANEOUSLY MEASURING FLUID DENSITY AND FLOW RATE ON A SINGLE PHOTOGRAPHIC FILM
Henry M. Buck, Houston, Tex., assignor, by mesne assignments, to Esso Production Research Company, Houston, Tex., a corporation of Delaware
Filed Dec. 30, 1963, Ser. No. 334,313
10 Claims. (Cl. 250—43.5)

The present invention concerns a self-contained, wire line, combination subsurface recording flowmeter and fluid density detector.

Briefly described, the invention comprises a device having uniquely combined means for measuring and simultaneously recording the flow rate and/or direction of flow and fluid density of well fluids downhole. A rotameter, float movable in response to the flow of well fluids, moves a rariation shield which permits more or less radiation to impinge on a film to record rate of flow of the well fluids and the intensity of the radiation passing through the well fluids and recorded (or the intensity of the film exposure) is a function of the density of the well fluids. The direction of flow is distinguished by using a different manner of film exposure for upwardly and downwardly flowing fluids.

A primary object, then, of the present invention is to provide a self-contained, wire line-suspended subsurface recording, combined flowmeter and fluid density detector for simultaneously measuring the flow rate, direction of flow, and density of well fluids.

The above object and other objects and advantages of the invention will become apparent from a more detailed description of the invention when taken with the drawings wherein:

FIG. 1 is a vertical view, partly in section, showing the combined flowmeter and density detector of the invention suspended by a solid wire line in a well pipe;

FIG. 2 is a vertical view, partly in section showing one modification of the flowmeter-density detector instrumentation of the invention;

FIG. 3 is a vertical view, partly in section showing the instrumentation of FIG. 2 from a different angle;

FIG. 4 illustrates a sample of developed film taken from the instrument of FIGS. 2 and 3;

FIG. 5 is a view similar to that of FIG. 3, but showing another modification of the invention;

FIG. 6 is an enlarged view of the shield portion of the apparatus of FIG. 5;

FIGS. 7 and 8 illustrate samples of developed film taken from the instrument of FIGS. 5 and 6; and FIGS. 9 and 10 are fragmentary views of modified shields to be used with the apparatus of FIGS. 5 and 6.

In FIG. 1 is shown a combined flowmeter and density detector 10 suspended in a well pipe 11 by a non-conductor, solid wire line 12. It includes a recording section 13 and a flow section 14 which is provided with flow deflectors 15, 15a, and fluid inlet and outlet openings 16 and 17. The recording and flow sections 13 and 14 of the device for making the flow-intensity recordings are shown in greater detail in FIGS. 2 and 3.

An embodiment of the invention designed for unidirectional flow is included in FIGS. 2, 3, and 4. In the recording section 13, a film 20 is arranged to travel in a chamber 18, formed in the elongated housing 19, which is isolated from well fluids on upper and lower pulleys 21 and 22 to unwind a spool 23 of film 20 past a slit 24 in a wall 25 of chamber 18 onto a spool 26. A cover 27, formed of aluminum or steel or glass of a minimum thickness to withstand well bore pressures, is arranged on slit 24 to protect the film from well fluids. Isolated chamber 18 also contains a motor 29 driven by batteries 30 for driving pully 21 and spool 26 and film 20 at constant speed through a speed reducer 31.

A radiation source 32 consisting of radioactive material is arranged on an interior wall 33 of housing 19 adjacent, but spaced from, slit 24. The radiation source is mounted in a housing of lead, tungsten, or a high density alloy which is provided with a slit to permit emission of a roughly collimated beam of rays to impinge on film 20 through slit 24. The material of inner wall 25 containing slit 24 is also formed of lead, tungsten, or a high density alloy to insure that film 20 is not exposed to radiation except through slit 24.

The flow section 14 of housing 19 is provided with an upper, interior surface 40 which tapers downwardly and inwardly and a lower, interior surface 41 which tapers inwardly and upwardly. Guides 42 project from these surfaces and a float shaft 43 provided with a rotameter float 44 extends through guides 42. The upper end of shraft 43 carries a triangularly configured shield 45 which is also formed of lead, tungsten, or a high-density alloy in order to block radiation passing to slit 24 and film 20. The position of the angular edge 46 of shield 45 along slit 24 determines the length of slit 24 exposed to radiation.

This embodiment of the invention operates in the following manner. The device, including the self-recording section 13 and flow section 14, is lowered in pipe 11 on wire line 12 with film 20 traveling at constant speed. When the lowest depth at which it is desired to measure and record the rate of flow and the density of the flowing fluid is reached, lowering of the instrument is halted and with flow diverters 15 diverting fluid flow through inlet 16 and outlet 17 past rotameter float 44 and radiation source 32 the flow rate and density of the fluid are recorded simultaneously. The flow rate is indicated by the amount of film exposed to radiation and the density is a function of the intensity of the radiation passing through slit 24.

The recording seen in FIG. 4 indicates both rate of flow of well fluids upwardly and the density of these fluids. The darker exposures indicate oil and the lighter exposures indicate water. The rate of flow is determined by the position of the rotameter 44. The higher the rate of flow, the higher triangular shield 45 is positioned and a greater amount of slit 24 is shielded from radiation. Thus, the higher rates of flow are indicated at A where the least amount of exposed film was recorded. B indicates an intermediate rate of flow, while C designates a still lower rate of flow.

The embodiment of the invention, illustrated in FIGS. 5 to 10, is designed to indicate direction of flow as well as the rate of flow and density of the well fluids. The recording portion of the apparatus is the same as that just described for the unidirectional flow embodiment illustrated in FIGS. 2 to 4.

The flow section 14 of housing 19a is provided with an upper interior surface 40a which tapers downwardly and inwardly, and a lower interior surface 41a which tapers upwardly and inwardly. A guide 42a through which shaft 43a extends is attached to surface 41a. Below the lower tapered surface 41a, housing 19a is provided with an opening 16a for ingress and egress of well fluids to or from the flow chamber formed by surfaces 40a, 41a. The lower end of float shaft 43a extends through a bushing 55 into a cylindrical member 51 contained in the lower end 50 of housing 19a. A spring 52, provided on its upper end with a flat plate 53, is arranged in cylinder 51. Shoulder 54 functions as a stop for the upward movement of plate 53. Shaft 43a is provided with a stop member 56 which prevents further upward and downward movement of shaft 43a upon contact with guide 42a and housing 19a.

Shield 45a, attached to the upper end of shaft 43a, is formed with an upper, triangularly configured part and a lower, perforated part. The perforations 47 extend angularly from the lower end of edge 46a. At the neutral flow position illustrated in FIGS. 5 and 6, the juncture of edge 46a and perforations 47 is positioned on slit 24 which, it is to be noted, extends beyond this point in order to obtain density indications, even though the fluid is not flowing.

FIG. 7 shows the record on film 20a for downwardly flowing well fluids as edge 46a exposes more or less of slit 24. A low flow rate is indicated at D. FIG. 8 shows the record for upwardly flowing well fluids as perforations 47 expose different portions of slit 24. An intermediate flow rate is indicated at E. The constantly exposed part part of film 20a caused by the unshielded part of slit 24 is indicated at F.

FIG. 9 illustrates a shield 45 in which perforations 48 overlap each other and FIG. 10 illustrates a shield 45c in which the lower part of the shield has an angular opening 49 instead of perforations 47 and 48.

This apparatus operates in a manner similar to the manner in which the embodiment of FIGS. 2 to 4 operates. The instrument is lowered in well pipe 11 on wire line 12 to a desired depth for flow and density measurements. Well fluids pass through the tapered surfaces of housing 19a upwardly or downwardly past float 44a and move float 44a up or down depending on the direction of flow. Downward flow causes shield 45a (or shields 45b or 45c) to move downwardly which exposes more of slit 24 and film 20a (which is traveling at a constant speed) to radiation from source 32. Increased flow rate increases the width of the exposure. Thus, the lower flow rate is represented by the least exposed portion D of film 20a. Upward flow causes shield 45a to move upwardly which moves each staggered perforation 47 across a different part of slit 24, thereby causing exposure of film 20a at selected points along the width thereof. Increased flow rate moves the exposure to the right as seen in FIG. 8. The lower flow rate is represented by the line exposure above line E and the higher flow rate is shown by the line exposure below line E. Fluid density is represented as before by the intensity of the exposure. Both of the shields of FIGS. 9 and 10 operate similarly; however, a continuous line exposure results in each case. The exposures made on film 20a for upward and downward fluid flow are easily distinguished from each other which permits a ready determination of the direction of fluid flow and the intensity of the exposure provides a ready fluid density indication.

The source of the radioactivity 32 may be one that emits beta or gamma rays. The gamma source is preferred. Sources of beta rays are $P^{32}$, (RaE), $Co^{60}$, $S^{35}$, $Na^{22}$, $Na^{24}$, and $UX_2$ and gamma sources may be $Co^{60}$, $I^{131}$, $Na^{24}$, $Zn^{65}$, $Cs^{137}$, $Au^{198}$, or $Cr^{51}$.

Any commercially available black and white roll film is suitable for use as film 20 or 20a. It can be the type 16 mm. or 35 mm. movie film that is sold throughout the United States. Desirable 35 mm. film would be Ansco Super pan S and 16 mm. would be Ansco Supreme; other suitable film would be Kodak Super Pan Press. These are all fast film; however, there is no need to restrict to fast film since it is the contrast between the shielded and unshielded part of the film and also the contrast between the low density (oil) and the higher density (water) that is recorded. These contrasts shown on a slower film as well as a fast film. It is desirable to use a fine grain, thin emulsion film for better resolution and higher probability of a particle striking a sensitive grain.

The triangular shield 45, 45a, 45b, and 45c may be aluminum, glass, or Lucite if the radiation source 32 is a beta ray emitter. If the preferred gamma ray source is used, then the shield should be lead, tungsten, or high density alloys.

Three features to consider in this invention are the energy of the particle, either beta or gamma; the thickness of the shielding material; and the effect of the particle on the film. The first of these factors is the most important and the others are dependent on it. In general, it is desirable to have the particle energy at the lowest level consistent with shielding in the instrument. The low energy level is desired, especially with gamma rays, because the shielding requirements are reduced and because low energy particles are detected better by the film to record the position of the rotameter float. The following tabulation shows the energy of some typical radiation sources suitable for use in the practice of this invention:

*Beta-ray sources*

| Material: | Energy |
|---|---|
| $P^{32}$ | 1.71 |
| (RaE) | 1.17 |
| $Co^{60}$ | 0.31 |
| $C^{14}$ | 0.15 |
| $S^{35}$ | 0.11 |
| $Na^{24}$ | 1.39 |
| $Na^{22}$ | 0.54 |
| $UX_2$ | 2.32 |

*Gamma-ray sources*

| Material: | Energy |
|---|---|
| $Cs^{137}$ | 0.66 |
| $I^{131}$ | 0.36 |
| $Au^{198}$ | 0.40 |
| $Cr^{51}$ | 0.32 |
| $Zn^{65}$ | 1.12 |

All these energies are expressed in million electron volts, mev. Accordingly, limits for the particle energy range from 0.1 mev. to 2.4 mev. There are many other sources of beta and of gamma rays within this range, as well as both above and below the selected range; but at gamma ray energy higher than the upper value, the shielding required to blank the film to indicate rotameter position becomes excessive, and below the limit, the penetrating power of the beta ray would be insufficient to permit any shielding on the rotameter float.

In radioactivity technology the absorption factor for a shield material is expressed as a density thickness product:

$$F = gm./cm.^3 \times cm. = gm./cm.^2$$

For beta rays it has been found that the thickness just penetrable by those rays may be calculated by the formula:

$$T = 0.536E - 0.165$$

This thickness multiplied by the density will give the density thickness, in gm./cm.², for that material. For the purpose of this invention the density thickness should range from about 0.02 to 34 gm./cm.² when a beta ray source is used.

When a gamma ray source is used, the absorption coefficient may be calculated by the formula:

$$\ln Io - \ln I - kx$$

Where Io is the number of secondary electrons with no shielding. I is the number of counts with a shield of known thickness in place; $k$ is the absorption factor; and $x$ is the thickness of the shield in place. Using this value for the absorption coefficient, then, the value for a half-value thickness can be calculated by the formula:

$$x/2 - 0.693/k$$

The gamma ray absorption coefficient is dependent on the gamma ray energy of the source material. Because of the high penetrating power of the gamma ray, and to obtain the maximum exposure effect on the film, the source of the gamma should be kept as low as possible for the shielding involved. In general, a density thickness in a range from 3.00 to 30. gm./cm.² of the shielding material should be used.

A primary source of material for the radiation and shielding requirements given above is "Applied Nuclear Physics" by E. C. Pollard and W. L. Davidson, published by John Wiley and Sons, Inc., New York, Tenth Printing, 1947, pages 228 and 229.

Modifications and variations of the apparatus shown and described herein may be made without departing from the spirit and scope of the invention.

Having fully described the nature, operation, and objects of my invention, I claim:

1. Apparatus suspendible in a well on a wire line comprising:

an elongated housing having upper and lower ports for permitting well fluids to flow through said housing, a portion of the interior wall of said housing being tapered inwardly in a downward direction in the upper portion thereof to define a variable area upper section, and a portion of said housing being isolated from said well fluids;

a float arranged in said housing longitudinally movable in response to the flow of well fluids through said housing;

a slit-shaped window formed in said isolated portion of said housing;

a movable film arranged in said isolated portion of said housing so as to move across the width of said window;

means for moving said film at constant speed;

a radioactive source arranged in said housing adapted to emit rays to be transmitted through said well fluids and recorded on said film exposed to said radiation, variations in the recorded radiation intensities being responsive to density changes in said well fluids; and a triangular-shaped shield connected to said float and movable therewith past said window in a manner to expose more or less of said film to said radiation in response to the rate of fluid flow, the density of the fluid flowing through said housing being indicated by the intensity of the radiation recorded on the unshielded portion of said film.

2. Apparatus suspendible in a well on a wire line comprising:

an elongated housing having upper and lower ports for permitting well fluids to flow through said housing, a portion of the interior wall of said housing being tapered to define a variable area;

a float arranged in said housing longitudinally movable in response to the flow of well fluids through said housing;

a movable film arranged in said housing;

a radioactive source arranged in said housing adapted to emit rays to be transmitted through said well fluids and recorded on said film exposed to said radiation, variations in the recorded radiation intensity being responsive to density changes in said well fluids; and means including a shield substantially opaque to said radiation connected to said float and movable therewith and configured and positioned so as to expose said film in a manner indicative of the rate of fluid flow.

3. Apparatus as recited in claim 2 in which said shield is triangularly configured to expose more or less of said film to radiation.

4. Apparatus suspendible in a well on a wire line comprising:

an elongated housing having upper and lower ports for permitting well fluids to flow through said housing, the interior wall of said housing being tapered inwardly in a downward direction in the upper portion thereof and inwardly in an upper direction in the lower portion thereof to define two variable area upper and lower sections, the smallest cross-sectional area being located between the upper and lower sections, and a portion of said housing being isolated from said well fluids;

a float arranged in said housing longitudinally movable in response to the flow of well fluids upwardly and downwardly through said housing;

a shaft connected to said float and movable therewith;

a spring connected to the lower end of said shaft adapted to bias downward movement of said shaft when said float is moved downwardly in said lower tapered portion of said housing;

a slit-shaped window formed in said isolated portion of said housing;

a movable film arranged in said isolated portion of said housing so as to move across the width of said window;

a radioactive source arranged in said housing adapted to emit rays to be transmitted through said well fluids and recorded on said film exposed to said radiation, variations in the recorded radiation intensities being responsive to density changes in said well fluids;

means for moving said film at constant speed; and a shield substantially opaque to said radiation connected to said float and movable therewith past said window, one portion of said shield being configured so as to expose said film to radiation in a manner indicative of fluid flow in one direction and another portion of said shield being differently configured so as to expose said film to radiation in a different manner indicative of fluid flow in an opposite direction, the density of the fluid flowing through said housing being indicated by the intensity of the radiation recorded on the unshielded portion of said film.

5. Apparatus suspendible in a well on a wire line comprising:

an elongated housing having upper and lower ports for permitting well fluids to flow through said housing, the interior wall of said housing being tapered inwardly in a downward direction in the upper portion thereof and inwardly in an upper direction in the lower portion thereof to define two variable area upper and lower sections, the smallest cross-sectional area being located between the upper and lower sections, and a portion of said housing being isolated from said well fluids;

a float arranged in said housing longitudinally movable in response to the flow of well fluids upwardly and downwardly through said housing;

a slit-shaped window formed in said isolated portion of said housing;

a movable film arranged in said isolated portion of said housing so as to move across the width of said window;

a radioactive source arranged in said housing adapted to emit rays to be transmitted through said well fluids and recorded on said film exposed to said radiation, variations in the recorded radiation intensities being responsive to density changes in said well fluids; and a shield substantially opaque to said radiation connected to said float and movable therewith past said window, one portion of said shield being configured so as to expose said film to radiation in a manner indicative of fluid flow in one direction and another portion of said shield being differently configured so as to expose said film to radiation in a different manner indicative of fluid flow in an opposite direction, the density of the fluid flowing through said housing being indicated by the intensity of the radiation recorded on the unshielded portion of said film.

6. Apparatus as recited in claim 5 in which said one portion of said shield is triangularly configured, one edge of said one portion of said shield extending at an angle to said slit so as to expose more or less of said film to radiation, and said other portion of said shield being provided with perforations extending at an angle to said slit so as to expose said film in a manner distinctive from said exposure with said one portion thereof.

7. Apparatus adaptable for use in measuring the rate of flowing fluid and the density thereof comprising in combination:
   radiation-emitting means adapted to transmit radiation through said flowing fluid;
   radiation recording means adapted to be exposed to said radiation transmitted through said flowing fluid; and
   means responsive to the rate of flow of said fluid including means adapted to vary exposure of said recording means to said radiation in response to fluid flow rate, the variations in exposure of said recording means to said radiation indicating rate of fluid flow and the intensity of said recorded radiation indicating density of said fluid.

8. Apparatus as recited in claim 7 in which said apparatus is suspendible in a well and said fluid comprises well fluid.

9. Apparatus adaptable for use in measuring the rate and direction of flowing fluid and the density thereof comprising in combination:
   radiation-emitting means adapted to transmit radiation through said flowing fluid;
   radiation recording means adapted to be exposed to said radiation transmitted through said flowing fluid; and
   means responsive to the rate of flow of said fluid provided with means adapted to vary exposure of said recording means to said radiation in response to said fluid flow rate including means adapted to provide indications of the direction of fluid flow, the variations in exposure of said recording means to said radiation indicating rate and direction of fluid flow and the intensity of said radiation recorded indicating density of said fluid.

10. Apparatus as recited in claim 9 in which said fluid comprises well fluid.

References Cited

UNITED STATES PATENTS

| 1,836,205 | 12/1931 | Townsend | 88—61 X |
| 2,220,198 | 11/1940 | Batsel | 88—61 X |
| 2,382,648 | 8/1945 | Martin | 250—231 X |
| 2,524,531 | 10/1950 | Lange | 250—233 X |
| 2,800,019 | 7/1957 | Rumble | 73—32 X |
| 2,965,753 | 12/1960 | Regnolds et al. | 250—43.5 |

FOREIGN PATENTS 940,071   10/1963   Great Britain.

RALPH G. NILSON, *Primary Examiner.*

ARCHIE R. BORCHELT, *Examiner.*

S. ELBAUM, *Assistant Examiner.*